US009860430B1

(12) United States Patent
Penza et al.

(10) Patent No.: US 9,860,430 B1
(45) Date of Patent: Jan. 2, 2018

(54) EMBLEM COVER ASSEMBLY

(71) Applicant: Honda Motor Co., Ltd., Tokyo (JP)

(72) Inventors: Brian A. Penza, Dublin, OH (US);
Ryan L. Kabbes, Delaware, OH (US);
Erich W. Bauer, Hilliard, OH (US);
Patrick M. Shafer, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/456,215

(22) Filed: Mar. 10, 2017

(51) Int. Cl.
*G03B 17/00* (2006.01)
*H04N 5/225* (2006.01)
*B60R 11/04* (2006.01)

(52) U.S. Cl.
CPC ........... *H04N 5/2252* (2013.01); *B60R 11/04* (2013.01); *B60R 2300/607* (2013.01)

(58) Field of Classification Search
USPC ......................................................... 396/427
See application file for complete search history.

(56) References Cited

U.S. PATENT DOCUMENTS

| | | | |
|---|---|---|---|
| 5,589,022 A * | 12/1996 | Kuwahara | B29C 65/04 156/231 |
| 7,226,187 B2 | 6/2007 | Yamazaki | |
| 7,619,575 B2 | 11/2009 | Kamiya et al. | |
| 8,922,655 B2 | 12/2014 | Forgue | |
| 9,150,165 B1 | 10/2015 | Fortin et al. | |
| 2006/0262003 A1 | 11/2006 | Kamiya et al. | |
| 2007/0031137 A1 * | 2/2007 | Bogdan | G02B 7/021 396/114 |
| 2007/0115434 A1 | 5/2007 | Oba et al. | |
| 2013/0215271 A1 | 8/2013 | Lu | |
| 2014/0218534 A1 | 8/2014 | Briggance | |
| 2015/0008300 A1 | 1/2015 | Jagoda | |
| 2015/0343949 A1 | 12/2015 | Portier | |
| 2016/0107585 A1 * | 4/2016 | Sugiura | B60R 11/04 296/1.08 |
| 2016/0280154 A1 * | 9/2016 | Koda | B60R 13/005 |
| 2017/0259754 A1 * | 9/2017 | Gong | B29C 69/02 |

FOREIGN PATENT DOCUMENTS

| | | |
|---|---|---|
| DE | 102007042611 A1 | 3/2009 |
| DE | 102009039962 A1 | 4/2010 |
| DE | 102012016571 A1 | 2/2014 |

\* cited by examiner

*Primary Examiner* — Rodney Fuller
(74) *Attorney, Agent, or Firm* — Honda Patents & Technologies North America, LLC; Mark E. Duell

(57) ABSTRACT

A sensor system assembly for a grille of a motor vehicle includes a camera, a cover assembly, and a radar unit covered by the cover assembly. The cover assembly includes a first thermoplastic layer having an outer edge and an inner edge defining a first opening for receiving the camera, a second thermoplastic layer having an outer edge and an inner edge defining a second opening for receiving the camera, the second opening being aligned with the first opening, the outer edge of the second thermoplastic layer being interlocked with outer edge of the first thermoplastic layer, and the inner edge of the second thermoplastic layer being interlocked with the inner edge of the first thermoplastic layer, and an emblem between the first thermoplastic layer and the second thermoplastic layer.

20 Claims, 5 Drawing Sheets

SECTION A-A

EMBLEM COVER ASSEMBLY

TECHNICAL FIELD

The embodiments described herein are related to the field of camera and sensor systems for use in a motor vehicle.

BACKGROUND

Surround view cameras (SVC) may be applied to motor vehicles to show the driver a birds-eye-view around the vehicle. The SVC is similar to a backup camera, but for all sides of the car. The camera in the front grille needs to be positioned forward in the grille to be free of blockage from the license plate, grille, and fenders. However, a SVC protruding from underneath the emblem may have a bad appearance. If the camera is moved up, it can protrude less due to optic requirements.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a sensor system assembly for a motor vehicle includes a sensor and a cover assembly. The cover assembly includes a first thermoplastic layer, the first thermoplastic layer having an outer edge and an inner edge defining a first opening for receiving the sensor and a second thermoplastic layer, the second thermoplastic layer having an outer edge and an inner edge defining a second opening for receiving the sensor, the second opening being aligned with the first opening, the outer edge of the second thermoplastic layer being interlocked with outer edge of the first thermoplastic layer, and the inner edge of the second thermoplastic layer being interlocked with the inner edge of the first thermoplastic layer.

According to another aspect, a sensor system assembly for a motor vehicle includes a first sensor, a cover assembly, and a second sensor cover by the covered assembly. The cover assembly includes a first thermoplastic layer, the first thermoplastic layer having an outer edge and an inner edge defining a first opening for receiving the first sensor and a second thermoplastic layer, the second thermoplastic layer having an outer edge and an inner edge defining a second opening for receiving the first sensor, the second opening being aligned with the first opening, the outer edge of the second thermoplastic layer being interlocked with outer edge of the first thermoplastic layer, and the inner edge of the second thermoplastic layer being interlocked with the inner edge of the first thermoplastic layer.

According to yet another aspect, a sensor system assembly for a grille of a motor vehicle includes a camera, a cover assembly, and a radar unit covered by the cover assembly. The cover assembly includes a first thermoplastic layer, the first thermoplastic layer having an outer edge and an inner edge defining a first opening for receiving the camera, a second thermoplastic layer, the second thermoplastic layer having an outer edge and an inner edge defining a second opening for receiving the camera, the second opening being aligned with the first opening, the outer edge of the second thermoplastic layer being interlocked with outer edge of the first thermoplastic layer, and the inner edge of the second thermoplastic layer being interlocked with the inner edge of the first thermoplastic layer, and an emblem between the first thermoplastic layer and the second thermoplastic layer.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
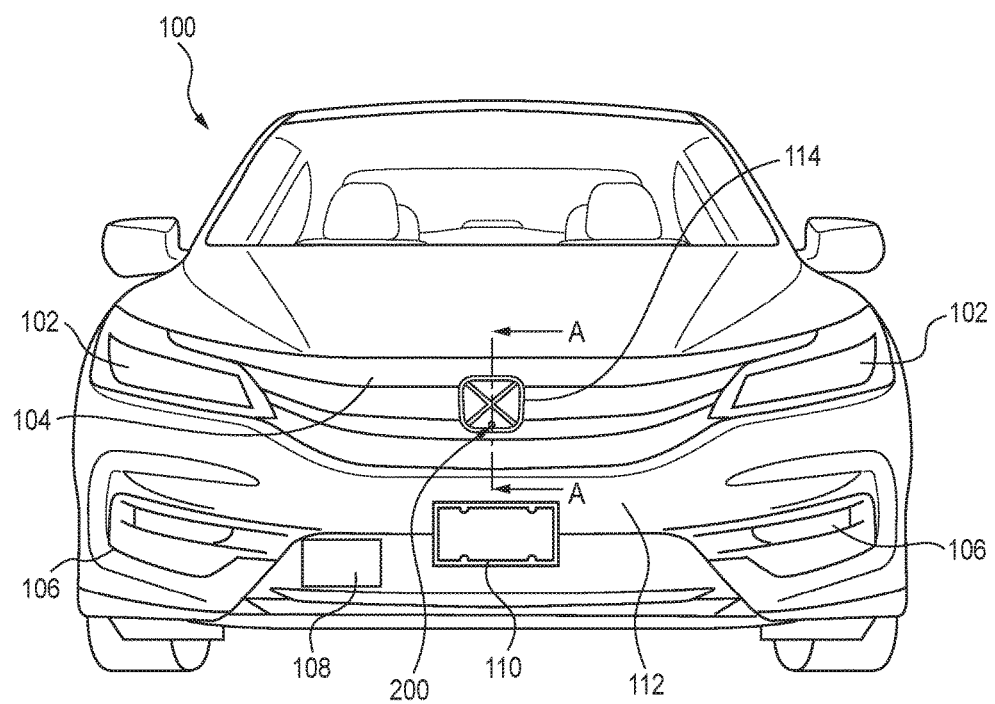
FIG. 1 is front view of a motor vehicle.

FIG. 1 is a front view of a motor vehicle 100. The motor vehicle 100 includes headlights 102, a front grille 104, fog lights 106, a lower grille 108, a license plate frame 110, a front bumper 112, and an emblem cover assembly 114, which may include an identifying mark or logo identifying the brand and/or manufacturer of the motor vehicle 100.

Figure 2:
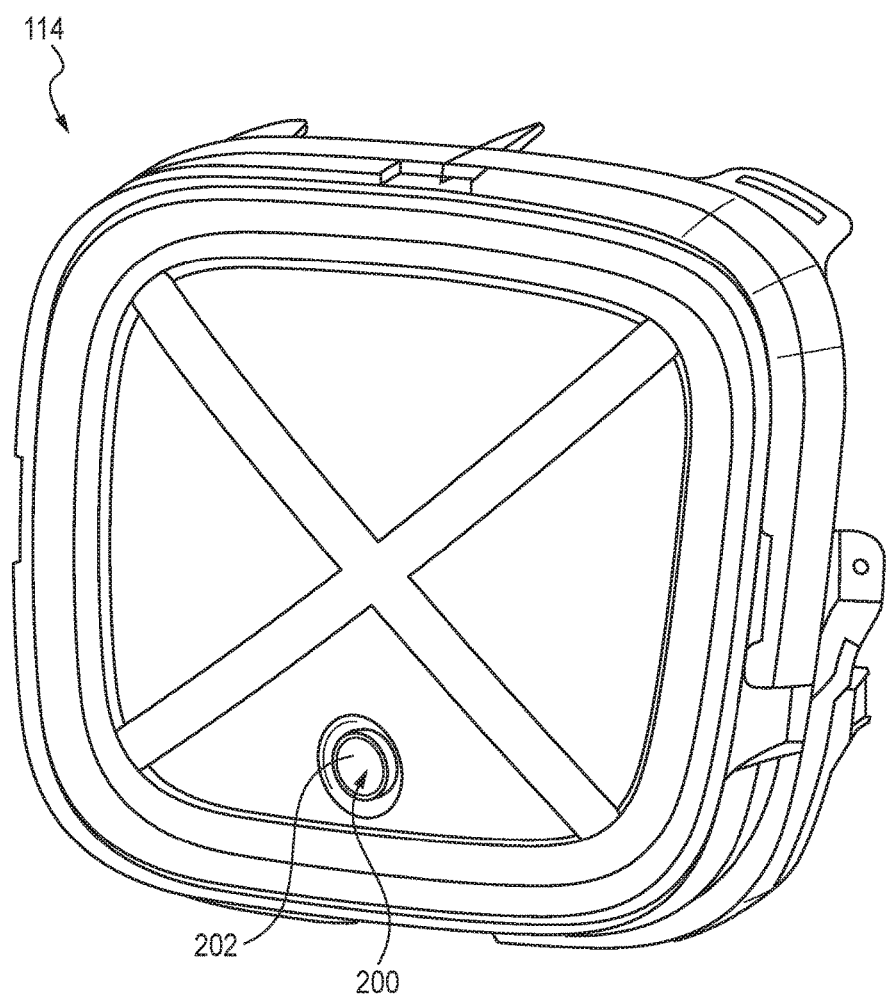
FIG. 2 is a perspective few of an emblem cover assembly.

With continuing reference to FIG. 1, FIG. 2 is a perspective view of the emblem cover assembly 114 of the motor vehicle 100. In one embodiment the motor vehicle 100 may be equipped with a sensor, such as camera 200, and further such as a surround view camera, to show the driver a birds-eye-view around the motor vehicle 100. The camera 200 is similar to a backup camera, but may be applied to all sides of the motor vehicle 100. The camera 200 is located in the front grille 104, and may be further located in the emblem cover assembly 114 that is also located in the front grille 104. The camera 200 needs to be positioned forward in the front grille 104 to be free of blockage from the license plate frame 110, front grille 104, lower grille 108, and the front bumper 112. In the embodiment illustrated in FIG. 2, the camera 200 is located within the emblem cover assembly 114 for improved appearance.

Figure 3:
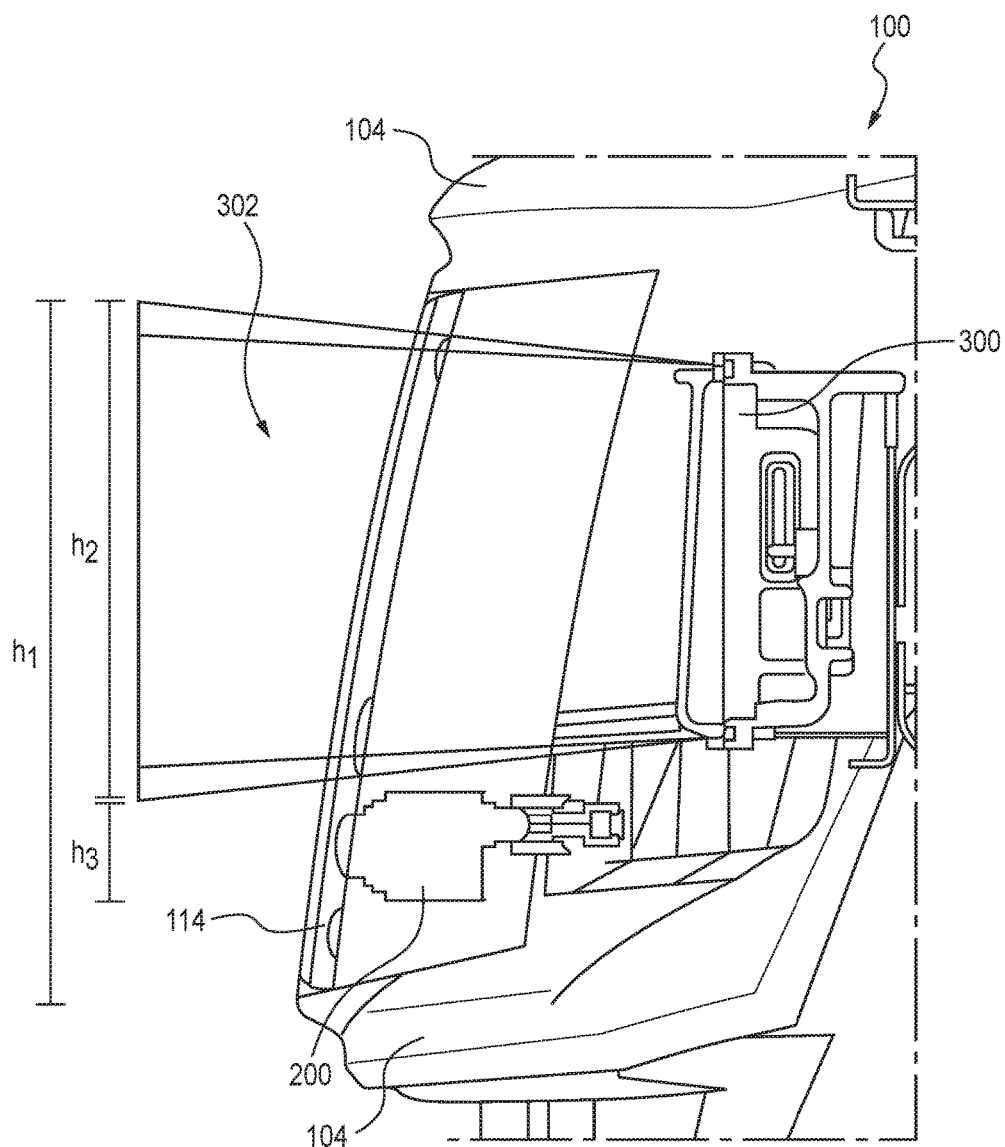
FIG. 3 is a cross-sectional view along line A-A of FIG. 1.

FIG. 3 is a cross-section along line A-A of FIG. 1 and illustrates the location of the camera 200 in the front grille 104. The embodiment illustrated also shows a second sensor, such as a radar unit 300 located behind the emblem cover assembly 114 for use with electronic systems of the motor vehicle 100, such as a collision mitigation braking system ("CMBS") or adaptive cruise control ("ACC"). The operating parameters of the radar unit 300 dictate the geometry of the emblem cover assembly 114, with nothing being located between the radar unit 300 and the emblem cover assembly 114 that may obscure or interfere with a radar zone 302 that defines the operating area of the radar unit 300.

The emblem cover assembly 114 may have a height $h_1$ that exceeds the height $h_2$ of the radar zone 302 and the height $h_3$ of the camera 200 such that the emblem obscures the radar unit 300 and body 304 of the camera 200 from view. The only portion of either unit visible, as illustrated in FIG. 2, is the camera optics 202, such as a lens. In addition to hiding these components from view, the emblem cover assembly 114 also serves to protect the radar unit 300 and camera 200 from damage and adverse weather.

Figure 4:
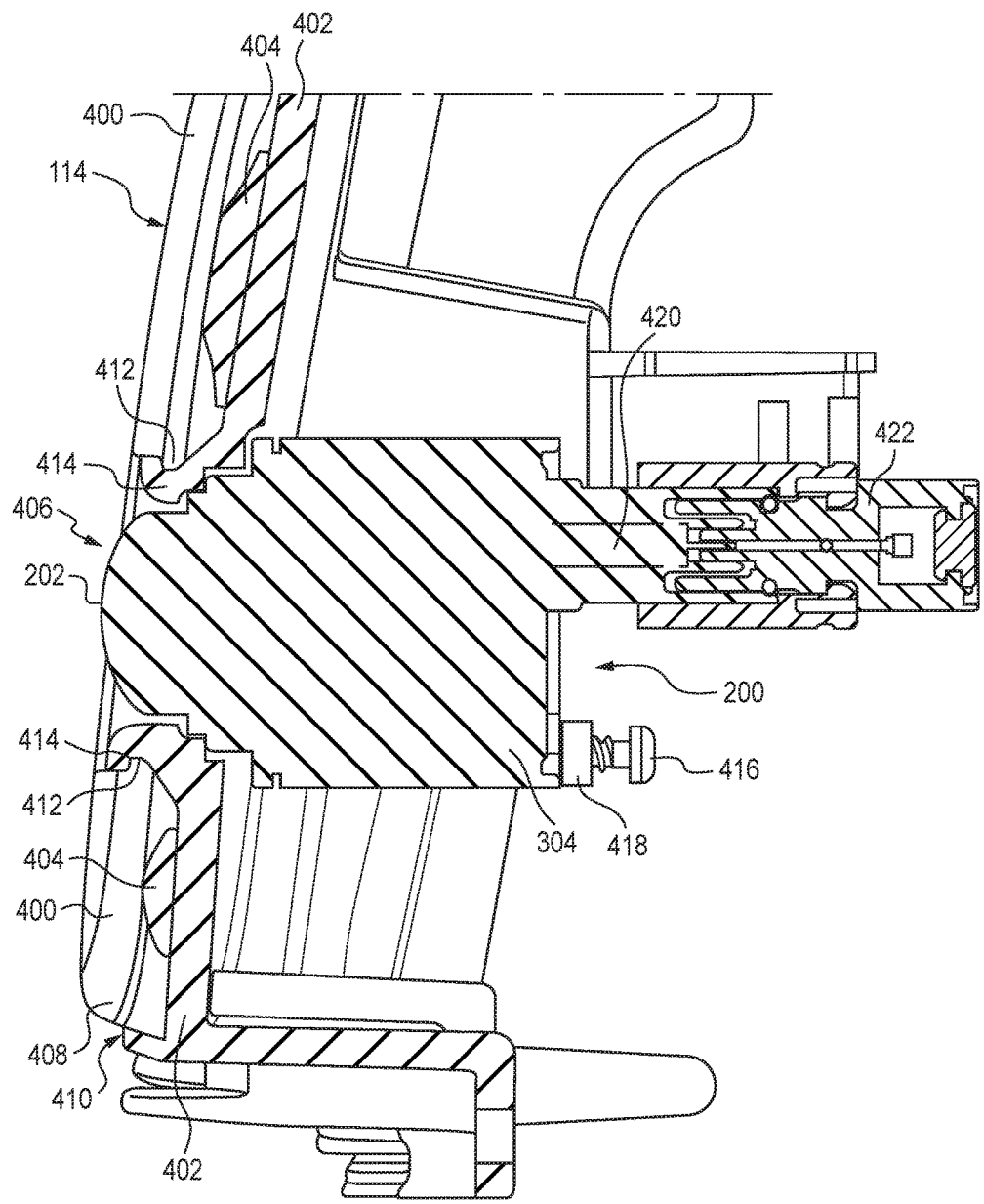
FIG. 4 is a close up view of a portion of FIG. 3.
Figure 5:
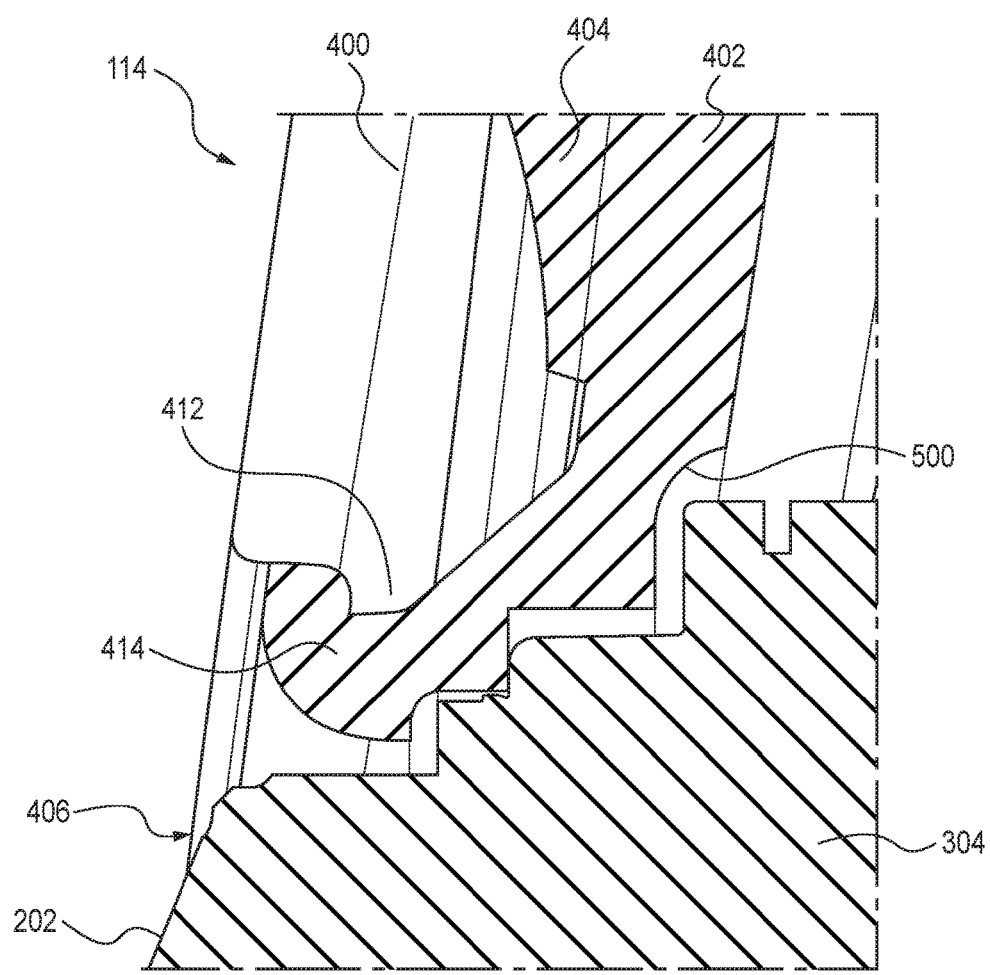
FIG. 5 is a close up view of a portion of FIG. 4.

The emblem cover assembly 114, of which successive close ups are illustrated in FIGS. 4 and 5, is constructed of a first thermoplastic layer 400 and a second thermoplastic layer 402. The first thermoplastic layer 400 may be a molded polycarbonate layer. An emblem 404, such a chrome logo or maker's identification, may be added, and the emblem cover assembly 114 is moved to a second tool where the second thermoplastic layer 402 is molded around the first thermoplastic layer 400. The second thermoplastic layer 402 may be a molded layer of acrylic butadiene styrene. The emblem cover assembly 114 includes a molded-in camera aperture 406 into which the camera optics 202 may be inserted.

In order to ensure that the emblem cover assembly 114 is watertight, the second thermoplastic layer 402 is molded around the outer edge 408 of the first thermoplastic layer 400 to create an interlocking junction 410 between the first and second thermoplastic layers 400, 402. Further, the second thermoplastic layer 402 is molded around the inner edge 412 of the first thermoplastic layer 400 that defines the camera aperture 406 to create an interlocking junction 414 between the first and second thermoplastic layers 400, 402. Molding the second thermoplastic layer 402 over the outer and inner edges 408, 412 of the first thermoplastic layer 400 creates a barrier for moisture to prevent moisture or fogging between the first and second thermoplastic layers 400, 402.

As illustrated in FIG. 5, the rear 500 of the second thermoplastic layer 402 of the emblem cover assembly 114 may be molded to further receive a portion of the body 304 of the camera 200, thereby creating a tight fit as the camera optics 202 are inserted through the camera aperture 406. With reference to FIG. 4, the camera 200 is held in place by a screw 416 that holds the camera to a structural member 418. Additionally, the camera 200 is includes a data transfer plug 420 plugged into a harness 422 that transmits the camera data from the camera 200 to the vehicle head unit for transmission to the user. The harness further helps to hold the camera 200 in place.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A sensor system assembly for a motor vehicle, comprising:
   a sensor; and
   a cover assembly, comprising:
      a first thermoplastic layer, the first thermoplastic layer having an outer edge and an inner edge defining a first opening for receiving the sensor; and
      a second thermoplastic layer, the second thermoplastic layer having an outer edge and an inner edge defining a second opening for receiving the sensor, the second opening being aligned with the first opening, the outer edge of the second thermoplastic layer being interlocked with outer edge of the first thermoplastic layer, and the inner edge of the second thermoplastic layer being interlocked with the inner edge of the first thermoplastic layer.

2. The sensor system assembly of claim 1 further comprising:
   an emblem between the first thermoplastic layer and the second thermoplastic layer.

3. The sensor system assembly of claim 2 wherein the sensor is a camera.

4. The sensor system assembly of claim 3 wherein the camera is a surround view camera.

5. The sensor system assembly of claim 4 wherein the first thermoplastic layer comprises polycarbonate.

6. The sensor system assembly of claim 5 wherein the second thermoplastic layer comprises acrylic butadiene styrene.

7. The sensor system assembly of claim 6 wherein the cover assembly is located on a grille of the motor vehicle.

8. The sensor system assembly of claim 7 further comprising:
   a second sensor located behind the cover assembly in the grille.

9. The sensor system assembly of claim 8 wherein the second sensor is a radar unit.

10. A sensor system assembly for a motor vehicle, comprising:
    a first sensor;
    a cover assembly, comprising:
       a first thermoplastic layer, the first thermoplastic layer having an outer edge and an inner edge defining a first opening for receiving the first sensor; and
       a second thermoplastic layer, the second thermoplastic layer having an outer edge and an inner edge defining a second opening for receiving the first sensor, the second opening being aligned with the first opening, the outer edge of the second thermoplastic layer being interlocked with outer edge of the first thermoplastic layer, and the inner edge of the second thermoplastic layer being interlocked with the inner edge of the first thermoplastic layer; and
    a second sensor covered by the cover assembly.

11. The sensor system assembly of claim 10 further comprising:
    an emblem between the first thermoplastic layer and the second thermoplastic layer.

12. The sensor system assembly of claim 11 wherein the sensor is a camera.

13. The sensor system assembly of claim 12 wherein the camera is a surround view camera.

14. The sensor system assembly of claim 13 wherein the second sensor is a radar unit.

15. The sensor system assembly of claim 14 wherein the first thermoplastic layer comprises polycarbonate.

16. The sensor system assembly of claim 15 wherein the second thermoplastic layer comprises acrylic butadiene styrene.

17. The sensor system assembly of claim 16 wherein the cover assembly is located on a grille of the motor vehicle.

18. A sensor system assembly for a grille of a motor vehicle, comprising:
   a camera;
   a cover assembly, comprising:
      a first thermoplastic layer, the first thermoplastic layer having an outer edge and an inner edge defining a first opening for receiving the camera;
      a second thermoplastic layer, the second thermoplastic layer having an outer edge and an inner edge defining a second opening for receiving the camera, the second opening being aligned with the first opening, the outer edge of the second thermoplastic layer being interlocked with outer edge of the first thermoplastic layer, and the inner edge of the second thermoplastic layer being interlocked with the inner edge of the first thermoplastic layer; and
      an emblem between the first thermoplastic layer and the second thermoplastic layer; and
   a radar unit covered by the cover assembly.

19. The sensor system assembly of claim 18 wherein the first thermoplastic layer comprises polycarbonate.

20. The sensor system assembly of claim 19 wherein the second thermoplastic layer comprises acrylic butadiene styrene.

* * * * *